March 29, 1960 C. B. BUDD 2,930,105
GLASS FIBER MATERIAL
Filed July 31, 1953

INVENTOR
Chester B. Budd
By James R. Lindsay
ATTY.

United States Patent Office 2,930,105
Patented Mar. 29, 1960

2,930,105

GLASS FIBER MATERIAL

Chester B. Budd, Brecksville, Ohio, assignor to The B. F. Goodrich Company, New York, N.Y., a corporation of New York Application July 31, 1953, Serial No. 371,533

8 Claims. (Cl. 28—80)

This invention relates to glass fiber materials, and in particular to a flexible yarn formed of coated glass fibers which has extraordinary resistance to wear and to the manufacture of such yarns and products made therefrom. This application is a continuation-in-part application of my copending applications, Serial No. 218,208, filed March 29, 1951, and Serial No. 313,940, filed October 9, 1952, both now abandoned.

Glass fibers have been known for a great many years to have many superlatively good qualities including extremely high strength and almost complete resistance to chemical attack. Many proposals have consequently been made for manufacture of textile materials from glass fibers, but have met with only limited success for several reasons. The most serious objection to the use of glass fiber textile material is that the glass fibers have failed quickly when subjected to flexure or working. The basic reason for such failures seems to be associated with the high coefficient of friction of glass on glass which leads to damage and fracture of the individual fibers during working of structures made from them. Attempts to overcome these limitations by application of coatings or other treatments have only partially alleviated but not removed the difficulties, and glass fibers have consequently been considered to be inherently unsuitable for many important uses to which their extremely high strength and other good qualities would otherwise adapt them.

It is an object of this invention to produce glass fiber materials which are not subject to the limitations of previously known glass fiber materials but which maintain their full strength and other desirable properties without essential change over long periods of wear. These new glass fiber materials can, consequently, be used for numerous purposes for which glass fibers have previously been considered to be quite unsuitable.

In accordance with this invention glass fibers are produced in one of the well-known ways and are coated with a metal. The metal-coated fibers then are fabricated into yarn by any of the textile processing techniques. In the formation of yarn from the metal-coated fibers, the individual fibers of the yarn must not be allowed to become bonded together through fusion of the metal coatings of adjacent fibers, but rather must be free to move relative to adjacent fibers during working and flexing of the yarn since unless such movement is possible a relatively rigid structure results which is unsuitable for use in textile materials. The presence of the metal coating on the glass fibers, preventing glass-to-glass contact during fabrication and use of the glass fiber material, brings about almost complete elimination of apparent brittleness or "shortness" of glass fibers, and permits them to resist long continue working, flexure, abrasion and the like.

In a modification of the invention the glass fiber with a metal coating is provided with a secondary coating, over the metal, of another material and preferably one which facilitates relative motion of the metal-coated fiber surfaces, and which, therefore, can be considered as a lubricant coating.

The glass fiber employed in this invention may be made from glass of various compositions containing silica with or without such glass-forming acids as boric acid and phosphoric acid and the like combined with such metal oxides as lime, baryta, lead oxide, zinc oxide, copper oxide, manganese oxide, iron oxide and with or without such glass-forming materials as arsenic, antimony which is normally introduced into the glass composition as an antimony oxide, and fluorides for example sodium fluoride or sodium silico-fluoride, as well as other well-known glass-forming constituents, together with the usual quantities of soda or potash, if desired. The composition of the glass which is selected will be such as may be appropriate for the fiber-forming equipment and procedure employed, for the metal coated on it, and for the ultimate use to which the glass fiber material is to be put, but is not critical since conventional glass compositions give very good results.

The metal coating may be composed of any of the commercially available solid metals or metal alloys, preferably those which are reasonably stable under ordinary atmospheric conditions and are at least somewhat ductile. Thus, the coating may be composed of such common metals as aluminum, cadmium, cobalt, chromium, copper, iron, lead, nickel, silver, tin or zinc or alloys of them, although less common metals such as antimony, beryllium, bismuth, cerium, columbium, gallium, gold, iridium, magnesium, molybdenum, platinum, tantalum, titanium, tungsten, and vanadium may be used, if desired, especially in the form of alloys with the more common metals. The more active metals such as magnesium or even a liquid metal such as mercury may be present in some proportion, especially if the metal is protected from exposure to the atmosphere.

In those instances in which a surface layer of another material is provided over the metal coating, the surface layer should be a material capable of functioning as a lubricant or protector for the metal, and may, therefore, be either a friction-reducing non-metallic material or a surface layer produced by a conversion of the surface of the metal to another compound. Accordingly, the surface layer may be composed of any oily or waxy material such as the high molecular weight hydrocarbons, alcohols, esters, organo-siloxanes or the like, but preferably is composed of such materials as are capable of firm adherence to the metal primary coating and of conferring extreme pressure lubricant properties to it such as the oxide, sulfide, chloride or other inorganic compound of the coating metal or a mixed compound containing more than one such non-metallic element, or a metal soap, or even a different metal.

It is believed that the coatings of metal alone, or of metal with a surface layer of other material, involved in this invention, function to improve the properties and eliminate the rapid deterioration of the glass fibers during use simply by preventing glass-to-glass contact. This can readily be visualized when it is considered that yarns of textile materials are normally bent sharply around other yarns or around those structures with which the yarns are brought in contact in normal use and that the flexing of the yarns while under strain brings the surfaces of the cylindrical glass fibers into point contact. Since glass at ordinary temperatures is practically devoid of ductility and possesses an extremely high coefficient of friction against another glass surface, the result of such contact is a fracture of the surface leading to concentration of stress at the point of fracture and failure of the fiber so affected. The presence of the metal coating on the glass fiber, with the ductility which is characteristic of metal, and especially when a surface layer of the kind mentioned above is present, permits sufficient deformation of the surface layers so that adjacent fibers can make area contact rather than point contact, and also permits the fibers to slide over one another with relative ease, thus avoiding the conditions responsible for previously observed failures. Regardless of whether or not this explanation is correct, it has been observed that the coated glass fiber material of this invention overcomes the previous difficulties and results in wearability such as has never before been possible.

The glass fibers to which the metal coating is applied should be of sufficiently small diameter to be of high strength and flexibility. While glass fibers up to about 0.01 inch may be used for some purposes, best results are obtained when very much finer glass fibers are used, of the order of 0.001 to 0.0001 inch diameter, since the unit strength of glass increases with decreasing fiber diameter and since the fine fibers by virtue of their small diameter are extremely flexible. The metal coating likewise may vary in dimensions over a considerable range, from the smallest thickness that can be deposited up to as much as 0.01 inch in some instances, although an intermediate thickness of about 0.000005 to 0.0005 inch is now preferred as being adequate to give good protection to the glass fiber without adding so much metal as to increase cost and decrease flexibility unduly. In the case of application of a further coating to the surface of the metal or of conversion of the metal surface to another material, the surface layer may have a thickness ranging within the same limits and preferably of the same order of magnitude as that of the metal coating itself.

The glass fiber may be prepared in the form of relatively short lengths or of continuous filament, but preferably the latter, since uniform application of the metal coating is thereby facilitated. The metal may be applied to the glass fiber by any procedure capable of depositing the desired quantity of metal to the glass surface such as by transfer of the metal in a vacuum in vapor form or liberation of the metal from a suitable chemical compound, or most simply by drawing a continuous glass filament in contact with a mass of molten metal.

In those instances in which a coating of another compound is desired on the surface of the metal coating, the other compound may be applied in a similar manner by volatilization or chemical reaction, or by direct contact of the metal-coated glass filament with the surface material in liquid form.

The invention is illustrated in the accompanying drawings in diagrammatic form in which.

Figure 1:
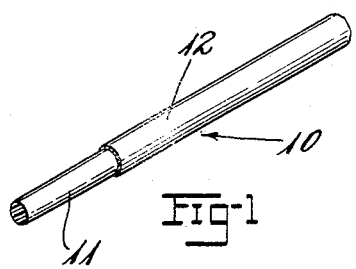
Fig. 1 is an enlarged perspective view partly broken away and in section of a metal-coated glass fiber employed in this invention.

In the drawings, fiber 10 comprises a glass fiber base member 11 of a small diameter within the range mentioned above. The term "fiber" when used in this specification, is intended to include both filaments and staple fibers, a filament being a fiber of long length generally over about 16 inches and preferably produced continuously in any desired length, and a staple fiber being a fiber in short lengths not over about 16 inches. For many purposes it is preferred that the glass fiber base member 11 be in the form of a continuous filament since the maximum strength of the fiber is more easily developed, but this invention may also be practiced by producing the glass fiber 11 as a staple fiber or by cutting it from a filament into staple lengths.

Figure 2:
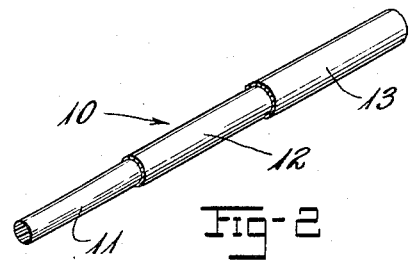
Fig. 2 is an enlarged perspective view partly broken away and in section of a glass fiber having a metal coating and a surface of another material over the metal.
Figure 3:
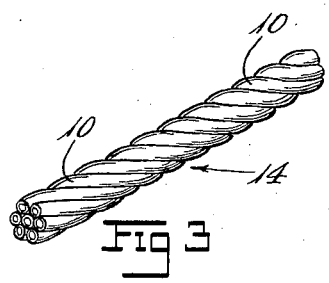
Fig. 3 is an enlarged perspective view of a yarn made from metal-coated glass fiber.

As shown in Fig. 1, the glass fiber base member 11 is provided with a metal coating 12 on its cylindrical surface. In accordance with this invention and as shown in Fig. 2, the metal-coated glass base member 11 shown in Fig. 1 may be coated with a secondary coating 13 of a material which functions as a lubricant layer. A number of individual coated fibers 10 are plied together to produce a flexible yarn 14 as illustrated in Fig. 3, the individual fibers 10 of the yarn being maintained as distinct and separate components of the yarn free of any actual union or bond between adjacent fibers, such as would occur if the metal coatings of the fibers were fused together, so that relative movement between adjacent fibers during working or flexing of the yarn may occur.

Figure 5:
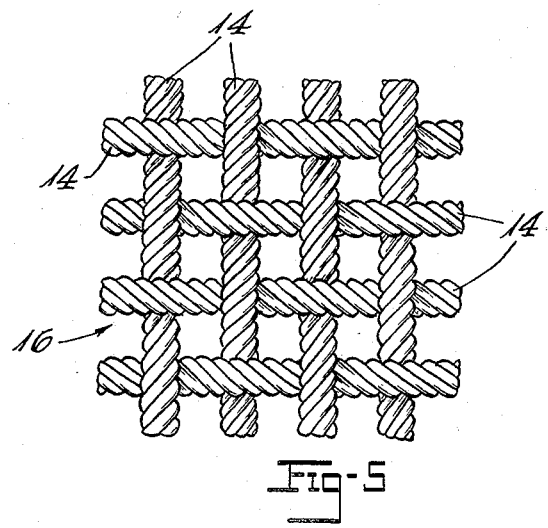
Fig. 5 is an enlarged plan view of a cloth woven from metal-coated glass fiber yarn.
Figure 4:
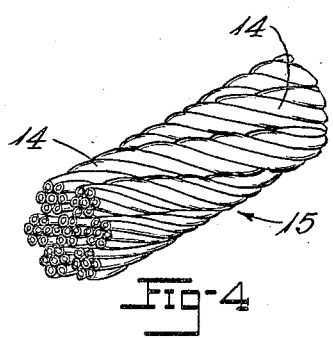
Fig. 4 is an enlarged perspective view of a cord made from metal-coated glass fiber yarn.

A number of such yarns 14 may be plied together to produce a cable cord 15 as shown in Fig. 4. Either yarns or cords so prepared may be fabricated into cloth such as the simple square-woven cloth 16 shown in Fig. 5, utilizing any of the textile fabricating techniques.

As an example of the outstanding results obtained in this invention, glass filaments 0.00032 inch in diameter are coated with metallic copper 0.00006 inch in thickness by exposing the individual filaments in a high vacuum to copper vapors emanating from a mass of copper metal heated to a temperature of about 1,700° C. Thirty-six copper-coated filaments so prepared are twisted together to form a thirty-six filament yarn. The resulting yarn is extraordinarily resistant to wear and flexure, the resistance increasing with age. A quantitative measure of resistance to flexure is obtained by repeated flexing of the yarn through an arc of 150° at a constant rate in comparison with a similar yarn made from the same glass filaments, but without any coating thereon. The uncoated glass filament yarn broke after about three minutes flexure. The freshly prepared yarn made from copper-coated glass filaments does not break until after being flexed for about 500 minutes. The copper-coated glass filament yarn after exposure to the air at ordinary room temperature of about 20° C. for three weeks to permit the surface of the copper coating to oxidize to copper oxide, does not fail or exhibit any apparent wear in this flexing test after a period of over 54,640 minutes.

A copper-coated glass filament yarn similar to that just described is exposed to the air for several days, passed through a dilute solution of stearic acid in a volatile solvent such as gasoline and allowed to stand until the surface was converted to copper stearate. Again the coated filament is extraordinarily resistant to failure on flexure.

Glass filaments 0.00032 inch in diameter are coated with a layer of zinc titanium alloy containing 1 percent titanium by drawing the filaments individually through a molten bead of the zinc titanium alloy composition and permitting the metal film thus deposited on the glass filament to solidify. The coated glass filaments are exposed to air for 17 hours at a temperature of 135° C. and then for 15½ hrs. at a temperature of 230° C. to hasten conversion of the outer layer of the metal to a metal oxide surface. For the purpose of comparison, thirty-six of the untreated glass filaments are twisted into a yarn which is compared with a similar yarn made from the filaments coated with the zinc titanium alloy before oxidation of the surface, and with a yarn made from the filaments with an oxidized metal surface. The metal-coated yarn and the yarn after oxidation of the surface of the metal are both extremely resistant to deterioration of flexing. The yarn with a freshly prepared zinc titanium metal coating, when subjected to repeated flexure through an arc of 150° as described above, exhibits a life span before failure of 21 times that of the uncoated glass filament yarn, and the metal-coated and oxidized glass filament yarn exhibits a life span 98 times that of the uncoated glass filament yarn.

Glass filaments 0.00032 inch in diameter are coated with chromium by exposing the individual filaments in a high vacuum to chromium vapors from highly heated metallic chromium. Thirty-six of the coated filaments are twisted together to form a yarn which exhibits excellent resistance to failure on flexure as compared to a thirty-six filament yarn of uncoated glass filaments of the same diameter.

A yarn is formed of thirty-six glass filaments coated with stainless steel. The stainless steel-coated filbers are prepared by exposing in high vacuum individual glass filaments 0.00032 inch in diameter to stainless steel (chromium-nickel-iron alloy) vapors from a highly heated mass of the metal. The stainless steel-coated filaments are twisted together in the usual manner to form a yarn. Here again the coated filaments are vastly superior in their resistance to failure on flexure to uncoated glass filaments.

The stainless steel-coated filaments described in the preceding paragraph are individually drawn through a molten bearing alloy (Babbitt metal) to deposit a thin coating of the bearing alloy over the primary stainless steel coating. The resulting filaments when fabricated into yarns show practically no deterioration when subjected to flexure.

The coated glass yarns of this invention are admirably adapted for uses in which textile materials are required to withstand unusually severe conditions, since the glass fiber base is extremely strong and resistant to change, and since the coatings on the glass fibers eliminate the failures caused by flexure or other mechanical working. Thus, the metal-coated glass fibers can be used as reinforcing materials for rubber products such as tires, belts, hose, and the like, for which glass fibers could not previously be used practically, because of the short life which such products containing glass fibers have always previously exhibited when subjected to repeated flexure.

As an example, any of the glass fiber yarns described above may be made up into cords by plying three of the yarns into a strand and three strands into a cable cord. The cords are passed through a resorcinol-formaldehyde-latex adhesive and are the rubberized by passing a web of parallel cords through a rubber calender. The rubberized cords are bias cut to the desired width and cord angle for tire plies and are built into pneumatic tires in the usual way except that fewer plies are needed in some instances because of the great strength of the glass fiber material. Two plies are adequate for passenger car tires instead of the four or six plies generally used when cotton or rayon cord tires are made. The glass cord tires so made are exceptionally smooth riding and durable.

Another important application of the metal-coated glass fiber yarns, of the above examples is their use as reinforcing material for conveyor and transmission belts. Both conveyor and transmission belts employing the metal-coated glass fiber yarn have remarkable strength and durability as compared to belts reinforced with textile material conventionally used or with cord or fabric of uncoated glass fibers. This is especially the case with conveyor belts for carrying hot materials, since the strength and service life of the glass fibers is not greatly affected by high temperatures unless they approach a red heat. Also, conveyor and transmission belts utilizing the coated glass fiber materials described herein are not susceptible to the degree of permanent stretch experienced with conveyor or transmission belts utilizing conventional textile material for reinforcement, the coated glass fibers being essentially completely elastic and inherently possessing a very low degree of elongation.

In a further modification, glass filaments coated with zinc titanium alloy as described above are chopped into staple fiber of about 4 inch length and the staple is spun into yarns. They are then woven into cloth which is then decorated by printing with a pigmented printing paste to produce decorative fabrics for drapery and like uses. Such fabrics are fireproof and completely resistant to rot or weathering. In heavier weights they make superb awnings which can be used year after year instead of requiring frequent replacement as has been required heretofore.

The glass fiber materials of this invention, indeed, may be fabricated into practically any of the products made from textile materials and particularly those required to resist mechanical stress and strain or chemical influences or attack by vermin or weathering. Where desired, the coated glass fiber material fabricated into textiles may be decorated by dyeing or printing the surface or by employing the methods leading to formation of textile products with any desired woven or knitted pattern. The textile products, also, may be impregnated or coated with any desired flexible material and may be fabricated into composite products other than those mentioned above, with a binder of rubber, flexible plastic, rigid plastic or the like, either with or without an intermediate adhesive material to bond the coated glass fiber textile material to the matrix.

In all these uses the glass fiber materials exhibit the remarkable strength which is characteristic of the finely drawn glass fiber which it contains, and is free from the fragility which has characterized products formerly made from glass fibers.

I claim:

1. A flexible yarn comprising flexible glass fibers individually coated with solid metal, the metal coating of an individual glass fiber maintaining said glass fiber essentially free from glass-to-glass contact with other glass fibers of said yarn, the individual coated glass fibers of said yarn being distinct components of said yarn free from actual union with adjacent fibers of said yarn allowing relative movement between the adjacent fibers during working and flexing of said yarn.

2. A flexible yarn comprising flexible glass fibers individually coated with solid metal and a lubricant layer over the metal coating, the metal coating and lubricant layer disposed over an individual glass fiber maintaining said glass fiber essentially free from glass-to-glass contact with other glass fibers of said yarn, the individual coated glass fibers of said yarn being distinct components of said yarn free from actual union with adjacent fibers of said yarn allowing relative movement between the adjacent fibers during working and flexing of said yarn.

3. A textile material comprising flexible yarn, said yarn comprising flexible glass fibers individually coated with solid metal, the metal coating of an individual glass fiber maintaining said glass fiber essentially free from glass-to-glass contact with other glass fibers of said yarn, the individual coated glass fibers of said yarn being distinct components of said yarn free from actual union with adjacent fibers of said yarn allowing relative movement between the adjacent fibers during working and flexing of said yarn.

4. A textile material comprising flexible yarn, said yarn comprising flexible glass fibers individually coated with solid metal and a lubricant layer over the metal coating, the metal coating and lubricant layer disposed over an individual glass fiber maintaining said glass fiber essentially free from glass-to-glass contact with other glass fibers of said yarn, the individual coated glass fibers of said yarn being distinct components of said yarn free from actual union with adjacent fibers of said yarn allowing relative movement between the adjacent fibers during working and flexing of said yarn.

5. A cord comprising flexible yarn, said yarn comprising flexible glass fibers individually coated with solid metal, the metal coating of an individual glass fiber maintaining said glass fiber essentially free from glass-to-glass contact with other glass fibers of said yarn, the individual coated glass fibers of said yarn being distinct components of said yarn free from actual union with adjacent fibers of said yarn allowing relative movement between the adjacent fibers during working and flexing of said yarn.

6. A cord comprising flexible yarn, said yarn comprising flexible glass fibers individually coated with solid metal and a lubricant layer over the metal coating, the metal coating and lubricant layer disposed over an individual glass fiber maintaining said glass fiber essentially free from glass-to-glass contact with other glass fibers of said yarn, the individual coated glass fibers of said yarn being distinct components of said yarn free from actual union with adjacent fibers of said yarn allowing relative movement between the adjacent fibers during working and flexing of said yarn.

7. A woven cloth comprising flexible yarn, said yarn comprising flexible glass fibers individually coated with solid metal, the metal coating of an individual glass fiber maintaining said glass fiber essentially free from glass-to-glass contact with other glass fibers of said yarn, the individual coated glass fibers of said yarn being distinct components of said yarn free from actual union with adjacent fibers of said yarn allowing relative movement between the adjacent fibers during working and flexing of said yarn.

8. A woven cloth comprising flexible yarn, said yarn comprising flexible glass fibers individually coated with solid metal and a lubricant layer over the metal coating, the metal coating and lubricant layer disposed over an individual glass fiber maintaining said glass fiber essentially free from glass-to-glass contact with other glass fibers of said yarn, the individual coated glass fibers of said yarn being distinct components of said yarn free from actual union with adjacent fibers of said yarn allowing relative movement between the adjacent fibers during working and flexing of said yarn.

References Cited in the file of this patent

UNITED STATES PATENTS

| | | |
|---|---|---|
| 2,251,913 | Brennan | Aug. 12, 1941 |
| 2,369,876 | Warren | Feb. 20, 1945 |
| 2,509,894 | Toulmin et al. | May 30, 1950 |
| 2,577,936 | Waggoner | Dec. 11, 1951 |
| 2,583,855 | Kenis | Jan. 29, 1952 |
| 2,616,165 | Brennan | Nov. 4, 1952 |
| 2,620,851 | Brown | Dec. 9, 1952 |
| 2,645,701 | Kerridge et al. | July 14, 1953 |
| 2,699,415 | Nachtman | Jan. 11, 1955 |
| 2,720,076 | Sachara | Oct. 11, 1955 |